(12) United States Patent
Kim et al.

(10) Patent No.: US 8,553,016 B2
(45) Date of Patent: Oct. 8, 2013

(54) MOBILE TERMINAL AND METHOD OF CONTROLLING OPERATION OF THE MOBILE TERMINAL

(75) Inventors: Jong Hwan Kim, Seoul (KR); Kwang Ho Eom, Seoul (KR)

(73) Assignee: LG Electronics Inc., Seoul (KR)

( * ) Notice: Subject to any disclaimer, the term of this patent is extended or adjusted under 35 U.S.C. 154(b) by 642 days.

(21) Appl. No.: 12/482,850

(22) Filed: Jun. 11, 2009

(65) Prior Publication Data
US 2010/0001980 A1 Jan. 7, 2010

(30) Foreign Application Priority Data

Jul. 7, 2008 (KR) .................. 10-2008-0065470

(51) Int. Cl.
*G06F 3/033* (2013.01)
(52) U.S. Cl.
USPC ........... 345/184; 345/156; 345/157; 345/158; 345/173
(58) Field of Classification Search
USPC .................................. 345/156, 157, 158, 173
See application file for complete search history.

(56) References Cited

U.S. PATENT DOCUMENTS

| | | | | |
|---|---|---|---|---|
| 6,347,290 B1 * | 2/2002 | Bartlett | ..................... | 702/150 |
| 7,301,528 B2 * | 11/2007 | Marvit et al. | ................. | 345/156 |
| 7,301,529 B2 * | 11/2007 | Marvit et al. | ................. | 345/156 |
| 8,018,435 B2 * | 9/2011 | Orchard et al. | ............... | 345/158 |
| 8,185,164 B2 * | 5/2012 | Kim | ............................. | 455/566 |
| 2004/0259591 A1 | 12/2004 | Grams et al. | | |
| 2007/0026869 A1 | 2/2007 | Dunko | | |
| 2008/0259094 A1 * | 10/2008 | Kim et al. | ..................... | 345/651 |
| 2009/0262074 A1 * | 10/2009 | Nasiri et al. | ................. | 345/158 |

FOREIGN PATENT DOCUMENTS

| | | |
|---|---|---|
| CN | 1930542 | 3/2007 |
| WO | 2005103863 | 11/2005 |

* cited by examiner

*Primary Examiner* — Alexander S Beck
*Assistant Examiner* — James M Holland
(74) *Attorney, Agent, or Firm* — Lee, Hong, Degerman, Kang & Waimey

(57) ABSTRACT

A method of controlling a mobile terminal includes displaying on a display of the mobile terminal a plurality of items, identifying a selected item of the plurality items, and detecting a first rotation of the mobile terminal about a first axis of rotation which exceeds a first threshold amount of rotation. The method further includes performing a first function that is associated with the selected item responsive to the detecting of the first rotation exceeding the first threshold, identifying a condition if a second rotation of the mobile terminal about a second axis of rotation exceeds a second threshold, or if a threshold time period elapses after the detecting of the first rotation and no further rotation of the mobile terminal has been detected, and responsive to the identifying of the condition, performing a second function that is associated with the selected item.

17 Claims, 17 Drawing Sheets

(a)        (b)

(a)        (b)

(a)     (b)

(a)     (b)

(a)    (b)

(a)            (b)

(a)            (b)

FIG. 19
(a) 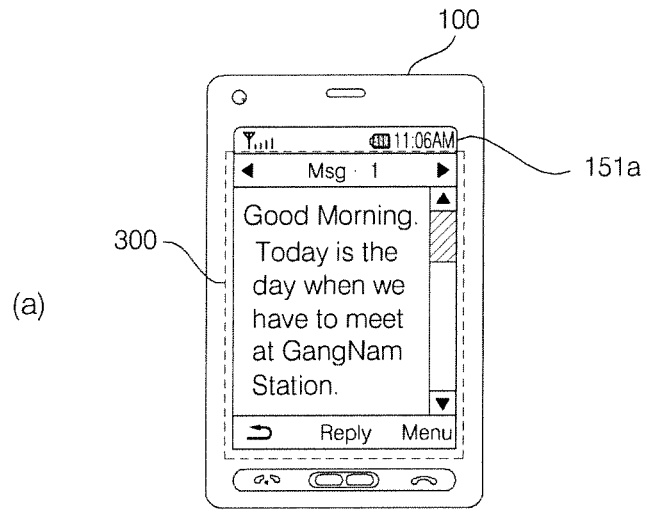
(b) 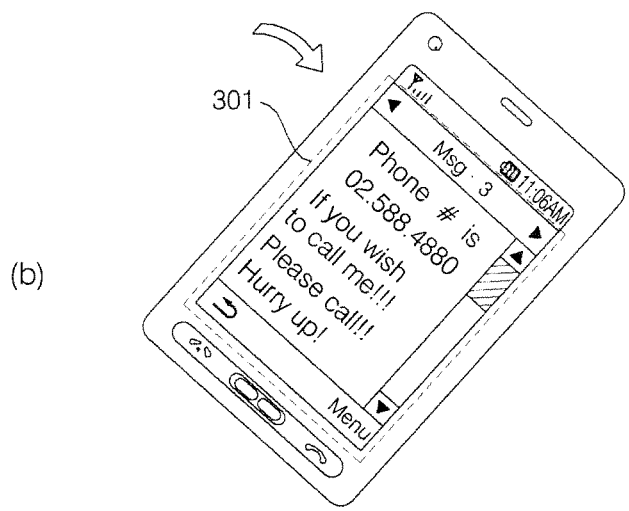
(c) 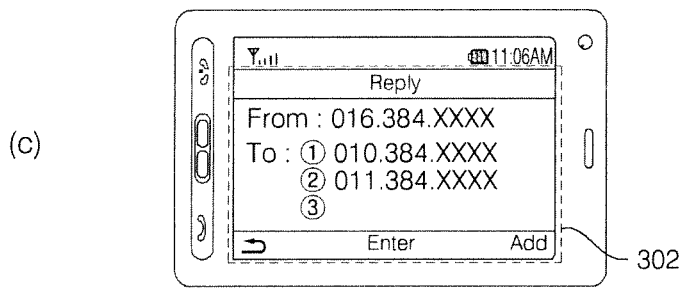

MOBILE TERMINAL AND METHOD OF CONTROLLING OPERATION OF THE MOBILE TERMINAL

CROSS-REFERENCE TO RELATED APPLICATION

Pursuant to 35 U.S.C. §119(a), this application claims the benefit of earlier filing date and right of priority to Korean Patent Application No. 2008-65470, filed Jul. 7, 2008, the contents of which are hereby incorporated by reference herein in their entirety.

FIELD OF THE INVENTION

The present invention relates to a mobile terminal, and in particular, to controlling the mobile terminal based on the motion of the mobile terminal detected by a sensor such as a gyro-sensor.

DESCRIPTION OF THE RELATED ART

Mobile terminals are portable devices which can provide users with various services such as a voice calling service, a video calling service, an information input/output service, and a data storage service. As the types of services provided by mobile terminals diversify, an increasing number of mobile terminals are equipped with various complicated functions such as capturing photos or video, playing music files or video files, providing game programs, receiving broadcast programs and providing wireless Internet services, thus evolving into multimedia players.

Various attempts have been made to realize such complicated functions as hardware devices or software programs. For example, various user interface (UI) environments, in which users are allowed to easily search for and choose desired functions, have been developed. In addition, the demand for mobile terminals with a double-sided liquid crystal display (LCD) or a full touch screen has steadily grown due to a growing tendency of considering mobile terminals as personal items that can express personal individuality.

However, the space for a UI, such as a display device or a keypad, is limited on a mobile terminal, and therefore, accommodating such UI on the mobile terminal without compromising the mobility and the portability of the mobile terminal is difficult. Therefore, in order to efficiently use various functions provided by a mobile terminal, it is often desirable to develop ways to effectively control the operation of the mobile terminal by employing a new data input/output method.

SUMMARY OF THE INVENTION

In accordance with an embodiment a method of controlling a mobile terminal includes displaying on a display of the mobile terminal a plurality of items; identifying a selected item of the plurality items; detecting a first rotation of the mobile terminal about a first axis of rotation which exceeds a first threshold amount of rotation; performing a first function that is associated with the selected item responsive to the detecting of the first rotation exceeding the first threshold; identifying a condition if a second rotation of the mobile terminal about a second axis of rotation exceeds a second threshold, or if a threshold time period elapses after the detecting of the first rotation and no further rotation of the mobile terminal has been detected; and responsive to the identifying of the condition, performing a second function that is associated with the selected item.

In accordance with another embodiment a mobile terminal includes a display configured to display a plurality of items, wherein a selected item of the plurality of items is identified; a sensor configured to detect a first rotation of the mobile terminal about a first axis of rotation which exceeds a first threshold amount of rotation, and detect a second rotation of the mobile terminal about a second axis of rotation that exceeds a second threshold; and a controller configured to: perform a first function that is associated with the selected item responsive to the detecting of the first rotation exceeding the first threshold; identify a condition if the second rotation exceeds the second threshold, or if a threshold time period elapses after the detecting of the first rotation and no further rotation of the mobile terminal has been detected; and responsive to the identifying of the condition, perform a second function that is associated with the selected item.

In accordance with yet another embodiment, the method of controlling a mobile terminal includes displaying on a display of the mobile terminal a plurality of items, wherein each of the plurality of items relate to a corresponding one of a plurality of messages; highlighting a selected item of the plurality items; detecting a first rotation of the mobile terminal about a first axis of rotation which exceeds a first threshold amount of rotation; performing a first function that is associated with the selected item responsive to the detecting of the first rotation exceeding the first threshold, wherein the first function comprises displaying on the display a first portion of a message that corresponds to the selected item; identifying a condition if a second rotation of the mobile terminal about a second axis of rotation exceeds a second threshold, or if a threshold time period elapses after the detecting of the first rotation and no further rotation of the mobile terminal has been detected; responsive to the identifying of the condition, performing a second function that is associated with the selected item, wherein the second function comprises ceasing the performing of the first function that is associated with the selected item and displaying on the display a second portion of the message that corresponds to the selected item, wherein the displaying of the second portion of the message defines a scrolling of the message that corresponds to the selected item; and modifying direction of the scrolling of the message responsive to direction of the second rotation.

BRIEF DESCRIPTION OF THE DRAWINGS

The above and other aspects, features, and advantages of the present invention will become more apparent upon consideration of the following description of preferred embodiments, taken in conjunction with the accompanying drawings.

FIGS. 19(a) through 20(c) illustrate diagrams for further describing the methods illustrated in FIG. 18.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

The term "mobile terminal", as used herein, may indicate a mobile phone, a smart phone, a laptop book computer, a digital broadcast receiver, a personal digital assistant (PDA), a portable multimedia player (PMP), or a navigation device.

Figure 1:
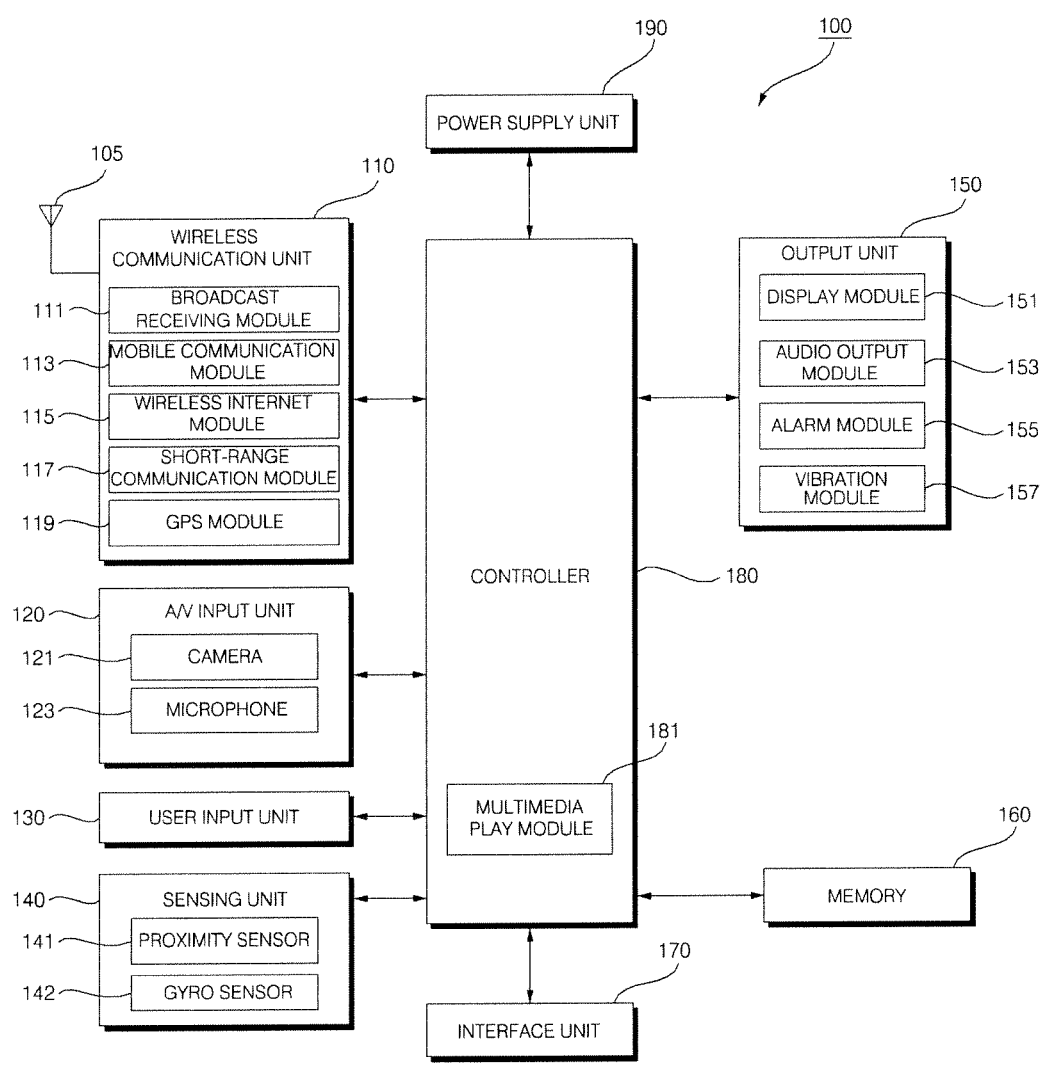
FIG. 1 illustrates a block diagram of a mobile terminal according to an embodiment of the present invention.

FIG. 1 illustrates a block diagram of a mobile terminal 100 according to an embodiment of the present invention. Referring to FIG. 1, the mobile terminal 100 includes a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast receiving module 111, a mobile communication module 113, a wireless Internet module 115, a short-range communication module 117, and a global positioning system (GPS) module 119.

The broadcast reception module 111 receives a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information, or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast receiving module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast receiving module 111 receives the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast receiving module 111 may be configured to be suitable for nearly all types of broadcasting systems other than those set forth herein. The broadcast signal and/or the broadcast-related information received by the broadcast receiving module 111 may be stored in the memory 160.

The mobile communication module 113 transmits wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 is a module for wirelessly accessing the Internet. The wireless Internet module 115 may be embedded in the mobile terminal 100 or may be installed in an external device.

The short-range communication module 117 is a module for short-range communication. The short-range communication module 117 may use various short-range communication techniques such as Bluetooth®, radio frequency identification (RFID), infrared data association (IrDA), ultra wideband (UWB), and ZigBee. The GPS module 119 may receive position information from a plurality of GPS satellites.

The A/V input unit 120 is used to receive audio signals or video signals. The A/V input unit 120 includes a camera 121 and a microphone 123. The camera 121 may process various image frames such as still images or video captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 generates key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is open or closed, the position of the mobile terminal 100 and whether the mobile terminal 100 is placed in contact with a user, and generates a sensing signal for controlling the operation of the mobile terminal 100. For example, if the mobile terminal 100 is a slider-type mobile phone, the sensing unit 140 may determine whether the mobile terminal 100 is open or closed. In addition, the sensing unit 140 may determine whether the mobile terminal 100 is powered by the power supply unit 190 and whether the interface unit 170 is connected to an external device.

The sensing unit 140 may include a proximity sensor 141. The proximity sensor 141 may determine whether there is an entity nearby and approaching the mobile terminal 100 without any mechanical contact with the entity. More specifically, the proximity sensor 141 may detect an entity that is nearby and approaching by detecting a change in an alternating magnetic field or the rate of change of static capacitance. The sensing unit 140 may include two or more proximity sensors 141.

The sensing unit 140 may also include a gyro-sensor 142 which senses the motion of an object by using a gyroscope. Examples of the gyro-sensor 142 include an inertial sensor and an acceleration sensor. A gyroscope may be implemented using a mechanical gyroscope, a ring laser gyroscope, an optic fiber gyroscope, and the like. The gyro-sensor 142 may sense the motion of the mobile terminal 100 and may thus provide a signal for controlling the mobile terminal 100.

The output unit 150 outputs audio signals, video signals and alarm signals. The output unit 150 may include the display module 151, an audio output module 153, an alarm module 155, and a vibration module 157.

The display module 151 displays various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is detected, the touch screen panel transmits a number of signals corresponding to the touch input. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module and an internal display module.

The audio output module 153 outputs audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 outputs an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output a signal upon receiving a call signal or a message. In addition, the alarm module 155 may receive a key signal and may output a signal as feedback to the key signal. Therefore, the user may be able to determine whether an event has occurred based on an alarm signal output by the alarm module 155. An alarm signal for notifying the user of the occurrence of an event may be output not only by the alarm module 155 but also by the display module 151 or the audio output module 153.

The vibration module 157 generates various types of vibrations having various intensities. The intensity, pattern, frequency, moving direction and moving speed of vibrations generated by the vibration module 157 may be determined by a vibration signal. The mobile terminal 100 may include two or more vibration modules 157.

The memory 160 stores various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory, such as a secure digital (SD) or extreme digital (XD) memory, a random access memory (RAM), and a read-only memory (ROM). The mobile terminal 100 may operate with a web storage, which performs the functions of the memory 160 via the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

The controller 180 controls operation of the mobile terminal 100. For example, the controller 180 may perform various control operations regarding making/receiving a voice call, transmitting/receiving data, or making/receiving a video call. The controller 180 may include a multimedia play module 181 that plays multimedia data. The multimedia play module 181 may be implemented as a hardware device and may be installed in the controller 180. Alternatively, the multimedia play module 181 may be implemented as a software program. The power supply unit 190 is supplied with power by an external power source or an internal power source and may supply power to the other components in the mobile terminal 100.

The exterior of the mobile terminal 100 will hereinafter be described in detail with reference to FIGS. 2 and 3. While the mobile terminal 100 is a bar-type mobile phone equipped with a full touch screen in these figures, disclosed embodiments are not restricted to the bar-type mobile phone. Rather, such features can be applied to various types of mobile phones such as a folder-type mobile phone, a swing-type mobile phone and a slider-type mobile phone.

Figure 2:
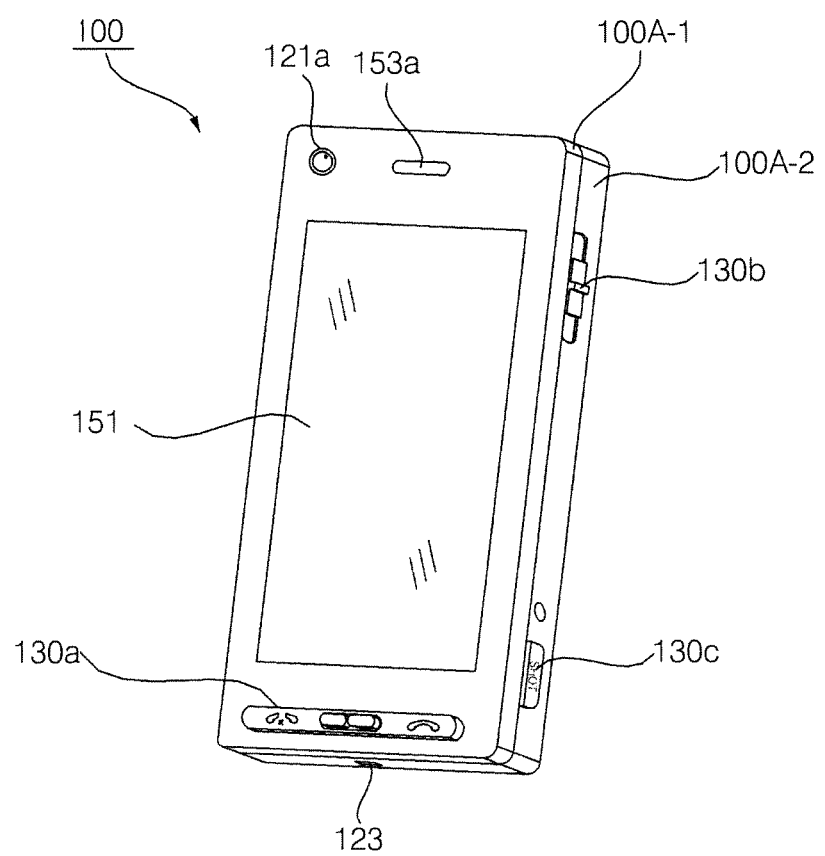
FIG. 2 illustrates a front perspective view of the mobile terminal shown in FIG. 1.

Referring to FIG. 2, the exterior of the mobile terminal 100 is defined by a front case 100A-1 and a rear case 100A-2. Various electronic products may be installed in the space between the front case 100A-1 and the rear case 100A-2. At least one intermediate case may be additionally disposed between the front case 100A-1 and the rear case 100A-2.

The front case 100A-1 and the rear case 100A-2 may be formed of a synthetic resin through injection molding. Alternatively, the front case 100A-1 and the rear case 100A-2 may be formed of a metal such as stainless steel (STS) or titanium (Ti).

In FIG. 2, the display module 151, a first sound module 153a, a first camera 121a and a first user input module 130a are disposed in the front case 100A-1. Second user input module 130b, third user input module 130c and microphone 123 are disposed on one side of the rear case 100A-2. The display module 151 may include an LCD or an OLED which can display information.

Since a touch pad may be configured to overlap the display module 151 to realize a layer structure, the display module 151 may serve as a touch screen. Thus, it is possible for the user to input information via the display module 151 simply by touching the display module 151.

The first sound module 153a may be implemented as a receiver or a speaker. The first camera 121a may be configured to capture a still image or a video of the user. The microphone 123 may be configured to properly receive the voice of the user or other sounds.

The first user input module 130a and second and third user input modules 130b and 130c may be collectively referred to as the user input unit 130. The user input unit 130 may adopt various manipulation methods as long as it can offer tactile feedback to the user.

For example, the user input unit 130 may be implemented as a dome switch or a touch pad which receives a command or information upon being pushed or touched by the user. Alternatively, the user input unit 130 may be implemented as a wheel, a jog dial, or a joystick. The first user input module 130a may be used to input such commands as "start", "end", and "scroll", the second user input unit 130b may be used to choose an operating mode, and the third user input module 130c may serve as a hot key for activating certain functions of the mobile terminal 100.

When the user's finger or a pointer approaches the display module 151, the proximity sensor 141 may detect the user's finger or pointer and output a proximity signal. The proximity signal output by the proximity sensor 141 may vary according to the distance between the display module 151 and the user's finger or pointer. More specifically, the mobile terminal 100 may include more than one proximity sensor 141 having different sensing ranges. In this case, it is possible to determine the distance between the display module 151 and the user's finger or pointer by comparing a plurality of proximity signals respectively provided by the proximity sensors 141. In addition, it is possible to determine which part of the display unit 151 is being approached by the user's finger or pointer and whether the user's finger or pointer is moving within a threshold range of the display unit 151 by determining which of the proximity sensors 141 outputs a proximity signal. Therefore, the controller 180 may choose a touch key corresponding to a part of the display unit 151 approached by the user's finger and control the vibration module 157 to output a vibration signal corresponding to the chosen touch key.

If the user tilts, shakes, rotates, or otherwise moves the mobile terminal 100, a suitable sensor such as gyro-sensor 142 detects the motion of the mobile terminal 100. Thereafter, the gyro-sensor 142 generates a signal corresponding to the movement of the mobile terminal 100 and outputs the signal to the controller 180. Then, the controller 180 may acquire various information regarding the movement of the mobile terminal 100 such as the direction, angle, velocity, and magnitude of the movement of the mobile terminal 100 and a current location of the mobile terminal from the signal generated by the gyro-sensor 142.

The controller 180 may track the movement of the mobile terminal 100 based on the information acquired from the signal generated by the gyro-sensor 142. The type of information that can be acquired from the signal generated by the gyro-sensor 142 may vary according to the type of the gyro-sensor 142. Thus, a gyro-sensor 142 capable of providing desired information may be included in the mobile terminal 100. The mobile terminal 100 typically includes at least one sensor (e.g., gyro-sensor 142). The controller 180 may control the gyro-sensor 142 to be driven only when a certain application is executed.

Figure 3:
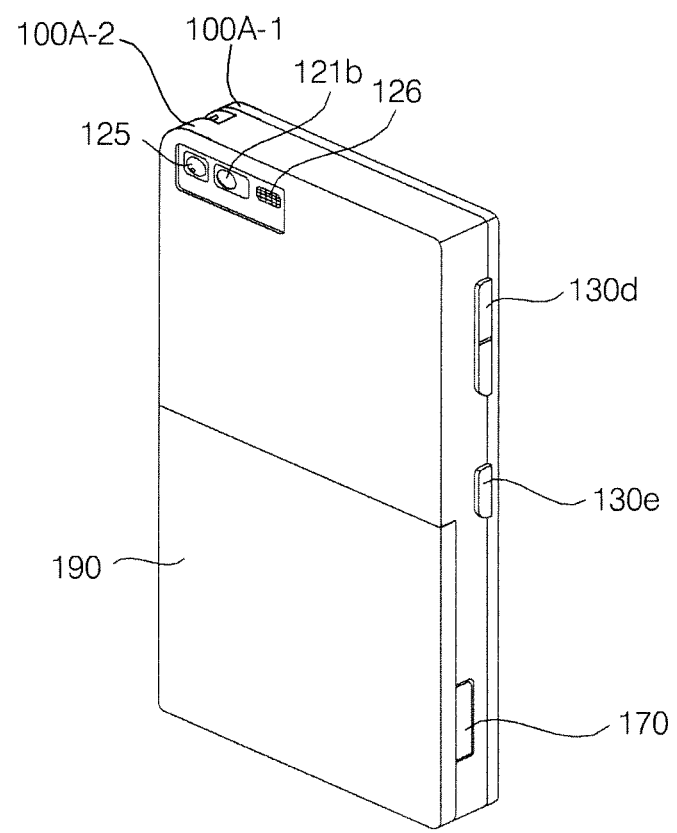
FIG. 3 illustrates a rear perspective view of the mobile terminal shown in FIG. 1.

FIG. 3 illustrates a rear perspective view of the mobile terminal 100 shown in FIG. 2. Referring to FIG. 3, fourth and fifth user input modules 130d and 130e and the interface unit 170 may be disposed on one side of the rear case 100A-2. A second camera 121b may be disposed at the rear of the rear case 100B-2.

The second camera 121b may have a different photographing direction from that of the first camera 121a shown in FIG. 2. In addition, the second camera 121b may have a different resolution from that of the first camera 121a. For example, the first camera 121a may be used to capture an image of the face of the user and then readily transmit the captured image during a video call. Thus, a low-resolution camera may be used as the first camera 121a. The second camera 121b may be used to capture an image of an ordinary subject. Given that images captured by the second camera 121b generally do not need to be transmitted, a high-resolution camera may be used as the second camera 121b.

A mirror 125 and a camera flash 126 may be disposed near the second camera 121b. The user may look in the mirror 125 to prepare himself or herself for taking a self-shot. The camera flash 126 may illuminate a subject when the second camera 121b captures an image of the subject.

A second audio output module may be additionally provided in the rear case 100A-2. The second audio output module may realize a stereo function along with the first audio output module 153a. The second audio output module may also be used during a speaker-phone mode.

An antenna for receiving a broadcast signal may be disposed on one side of the rear case 100A-2. The antenna may be installed so as to be able to be pulled out of the rear case 100A-2. The interface unit 170 may serve as a path for allowing the mobile terminal 100 to exchange to convey data. For example, the interface unit 170 may be a connection port for connecting an earphone, a short-range communication port, or a power supply port for supplying power to the mobile terminal 100. Alternatively, the interface unit 170 may be a card socket for accommodating an exterior card such as a SIM card, a UIM card or a memory card.

A power supply unit may be disposed in the rear case 100A-2. The power supply unit may be a rechargeable battery and may be coupled to the rear case 100A-2 so as to be attachable to or detachable from the rear case 100A-2.

The second camera 121b is illustrated in FIG. 3 as being disposed in the rear case 100A-2, but other configurations are possible. In addition, the first camera 121a may be rotatable to cover the photographing direction of the second camera 121b. In this case, the second camera 121b may be optional.

Figure 4:
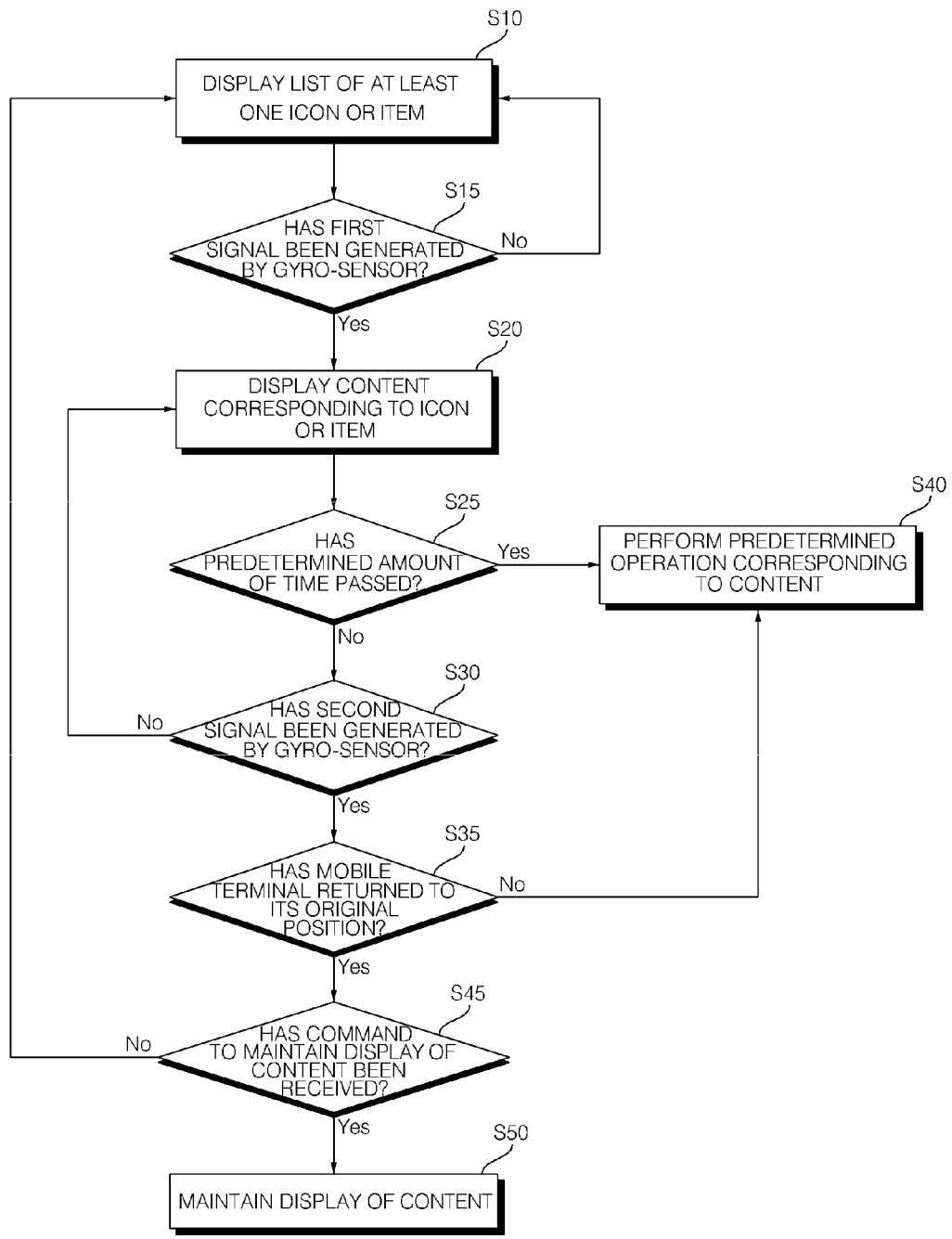
FIGS. 4 and 5 are flowcharts illustrating operation of a mobile terminal according to an embodiment of the present invention.
Figure 5:
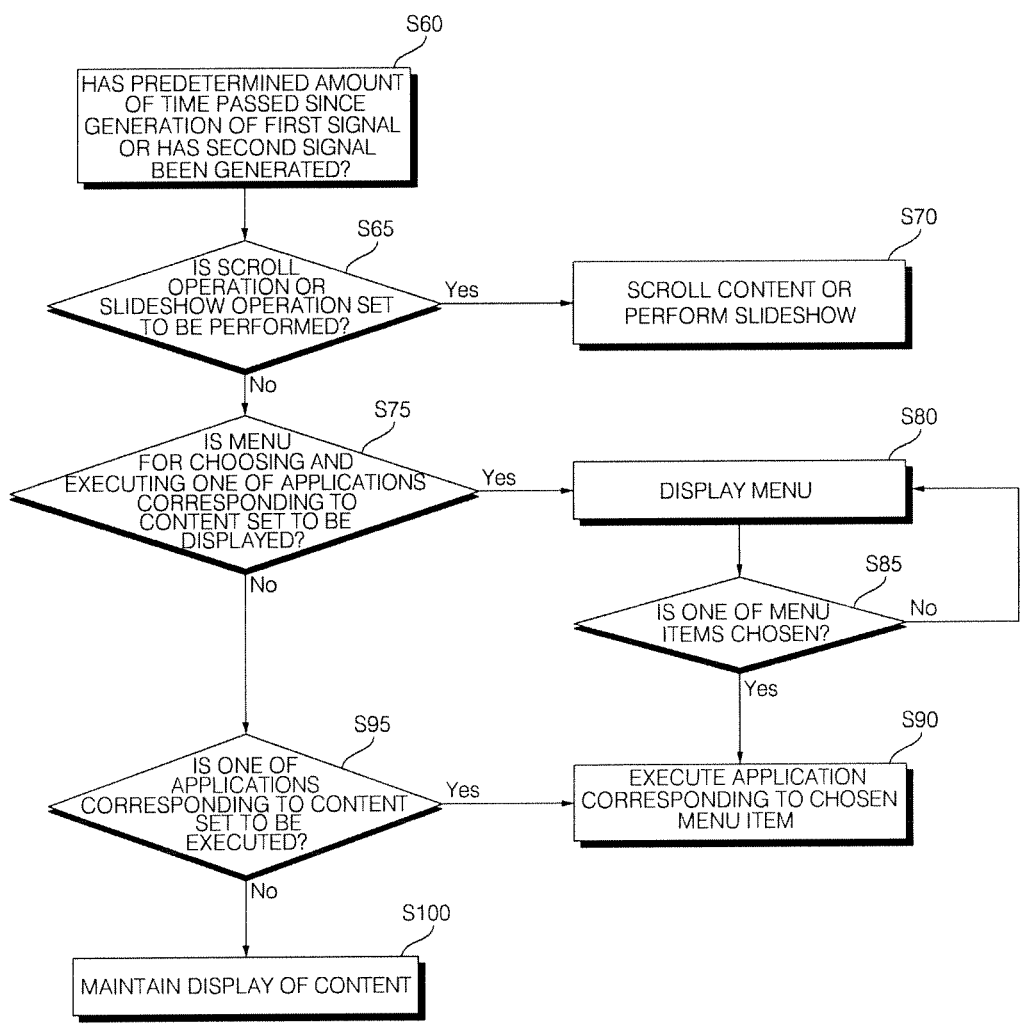

The flowcharts in FIGS. 4 and 5 illustrate a method of controlling a mobile terminal according to an embodiment of the present invention. The gyro-sensor 142 of the mobile terminal 100 detects the motion of the mobile terminal 100 and generates a signal corresponding to the detected motion. Thereafter, the gyro-sensor 142 outputs the generated signal to the controller 180. The controller 180 detects motion information of the mobile terminal 100 from the signal output by the gyro-sensor 142. The motion information detected by the controller 180 may vary according to the type of the gyro-sensor 142 or the type of operation performed by the mobile terminal 100. The controller 180 may control the display module 151 to display a screen image corresponding to the motion information of the mobile terminal 100.

In the embodiments exemplified in FIGS. 4 and 5, a predetermined operation may be performed according to motion experienced by mobile terminal 100. Referring to FIG. 4, the controller 180 displays a list of icons or items respectively corresponding to contents in a display region of the display module 151 (S10). Examples of the contents include various types of contents that can be provided to the user by the mobile terminal 100 such as text messages, multimedia messages, photo files, moving image files, music files, web documents, or various information stored in a phone book.

The user may select one of the icons or the items included in the list. Then, the controller 180 may display content corresponding the selected icon or item in the display region. For example, if a list of incoming text messages is displayed in the display region, the user may select one of the incoming text messages and may press an "OK" icon. Then, the controller 180 may display the selected incoming text message in the entire display region.

In the embodiment according to FIGS. 4 and 5, content may be displayed in the entire display region in response to motion of the mobile terminal 100 detected by the gyro-sensor 142, for example, without the need for the user to manipulate any soft- or hard-key. The controller 180 may determine whether a first signal corresponding to the motion of the mobile terminal 100 has been generated by the gyro-sensor 142 (S15). The gyro-sensor 142 may generate the first signal when the user tilts the mobile terminal 100 to the right by about 45 degrees. Alternatively, the gyro-sensor 142 may generate the first signal when the mobile terminal 100 is rotated by more than a preset or threshold angle or is moved in a predetermined manner. However, the rotation angle of the mobile terminal 100 or the degree and pattern of the movement of the mobile terminal 100 for generating the first signal are not restricted to those set forth herein.

To facilitate functionality of gyro-sensor 142, the controller 180 may set the gyro-sensor 142 to be activated when the mobile terminal 100 performs a predetermined operation. For example, in the embodiment according to FIGS. 4 and 5, the controller 180 may display a list of icons or items in the display region and then activate the gyro-sensor 142. Thereafter, the controller 180 may determine whether a signal has been generated by the gyro-sensor 142.

The controller 180 may display content (hereinafter referred to as the current content) corresponding to an icon or item currently being highlighted or pointed at by a cursor on display module (S20). Specifically, if the content corresponding to the highlighted or pointed-to icon or item is a text message or a multimedia message, the controller 180 may display the content of the text message or the multimedia message in the display region. On the other hand, if the content corresponding to the highlighted or pointed-to icon or item is a music file or a video file, the controller 180 may display a screen image corresponding to the file in the display region while playing the file.

The controller 180 may determine whether a preset or threshold amount of time has passed since the first signal was detected for the first time (S25). The gyro-sensor 142 may keep generating the first signal while the mobile terminal 100 maintains its state of rotation. Alternatively, the gyro-sensor 142 may generate the first signal once the rotation of the mobile terminal 100 is detected for the first time. For example, if the mobile terminal 100 is rotated to the right by about 45 degrees, the gyro-sensor 142 may keep generating the first signal while the mobile terminal 100 maintains its state of rotation or may generate the first signal when the rotation of the mobile terminal 100 is detected for the first time. If the gyro-sensor 142 keeps generating the first signal, the controller 180 may determine whether a preset or threshold amount of time has passed since the first signal was detected for the first time.

If it is determined that the preset or threshold amount of time has passed since the first signal was detected for the first time, the controller 180 may perform a predetermined operation corresponding to the current content (S40). The type of operation performed in operation S25 may vary according to the type of current content and motion information detected from a second signal generated by the gyro-sensor 142.

Examples of the predetermined operation corresponding to the current content include executing an application corresponding to the current content and displaying an application menu corresponding to the current content. If the current content is an incoming text message received by the mobile terminal 100, the controller 180 may execute at least one of an application for sending a reply text message to the sender, an application for forwarding the incoming text message, an application for deleting the incoming text message, an application for editing the incoming text message, an application for storing the incoming text message, an application for searching for the incoming text message, an application for registering the incoming text message as a spam text message, an application for editing the sender's phone number, an application for storing the sender's phone number, an application for searching for the sender's phone number and an application for filtering the sender's phone number.

If the current content is a multimedia content such as a photo, a music file or a video file, the controller 180 may execute at least one of an application for copying the multimedia content, an application for moving the multimedia content, an application for editing the name of the multimedia content, an application for editing the image of the multimedia content, an application for setting a write lock on the multimedia content, setting a read lock on the multimedia content, an application for displaying file information of the multimedia content, an application for setting the multimedia content as a background screen, an application for setting the multimedia content as a ringtone, an application for enlarging the multimedia content, an application for reducing the multimedia content, an application for sending the multimedia content, and an application for deleting the multimedia content.

The controller 180 may determine whether a second signal has been generated by the gyro-sensor 142 within a preset amount of time when the first signal was detected for the first time (S30). The gyro-sensor 142 may generate the second signal when the mobile terminal 100 is rotated by a preset angle, shaken or moved in a predetermined manner. If the first signal is generated when the mobile terminal 100 is rotated to the left or to the right by about 45 degrees or tilted forward or backward, the second signal may be generated not only when the mobile terminal 100 is rotated further to the left or to the right by a threshold amount (e.g., 45 degrees) or tilted further forward or backward, but also when the mobile terminal 100 is rotated or tilted back to its original position.

For example, if the first signal is generated when the mobile terminal 100 is rotated to the right by about 45 degrees, the second signal may be generated not only when the mobile terminal 100 is rotated further to the right by about 45 degrees but also when the mobile terminal 100 returns to its original position by being rotated to the left by about 45 degrees. Therefore, the controller 180 may determine whether the mobile terminal 100 has returned to its original position based on motion information obtained from the second signal (S35).

If it is determined that the mobile terminal 100 has not yet returned to its original position, or if the first signal is generated by rotating the mobile terminal 100 to the right by about 45 degrees and the second signal is generated by rotating the mobile terminal 100 further to the right by about 45 degrees, the controller 180 may determine whether a command to maintain the display of the content has been received (S45). Specifically, the controller 180 may determine whether the mobile terminal 100 has returned to its original position based on the motion information detected from the second signal. For example, if the rotation direction of the mobile terminal 100 detected from the second signal is opposite of the rotation direction of the mobile terminal 100 detected from the first signal and the rotation angle of the mobile terminal 100 detected from the second signal is similar to the rotation angle of the mobile terminal 100 detected from the first signal, the controller 180 may determine that the mobile terminal 100 has returned to its original position.

If the mobile terminal 100 is equipped with a touch screen, the command to maintain the display of the content may be entered by touching the touch screen. Alternatively, the command to maintain the display of the content may be entered via a key for entering the command to maintain the display of the content. If it is determined that the command to maintain the display of the content has been received, the controller 180 may maintain the display of the current content (S50) regardless of whether the mobile terminal 100 has returned to its original position.

That is, if the user tilts the mobile terminal 100 to the right by about 45 degrees when a list of icons or items is displayed in the display region (S10), the controller 180 may display content corresponding to one of the icons or items included in the list in the entire display region (S20). Thereafter, if the user tilts the mobile terminal 100 to the left by about 45 degrees such that the mobile terminal 100 returns to its original position while touching a touch screen, if any, of the mobile terminal 100 or pressing a side key of the mobile terminal 100, the controller 180 may maintain the display of the current content. On the other hand, if the mobile terminal 100 is determined to have returned to its original position and the command to maintain the display of the content has not yet been received, the method returns to operation S10 in FIG. 4.

The flowchart in FIG. 5 illustrates various operations in response to the second signal. In the embodiment exemplified in FIGS. 4 and 5, the type of operation that can be performed in response to the second signal may vary.

Referring to FIG. 5, if it is determined that a preset amount of time has passed since the first signal was detected for the first time or that the second signal has been generated (S60), the controller 180 may determine whether an operation set to be performed in response to the second signal is a content-scroll operation or a slideshow operation (S65). Thereafter, the controller 180 may perform the content-scroll operation or the slideshow operation (S70). The content-scroll operation may be performed when the content currently being displayed in the display region, or the current content, cannot be displayed entirely in the display region. The slideshow operation may be performed in order to sequentially display a plurality of contents respectively corresponding to the icons or items included in the list displayed in operation S10.

The direction in which and the speed at which the current content is scrolled or the direction in which and the speed at which the contents respectively corresponding to the icons or items included in the list displayed in operation S10 are displayed in a slideshow mode may be determined by motion information detected from the second signal. For example, if the motion information detected from the second signal indicates that the mobile terminal 100 has been tilted or moved further to the right, the controller 180 may scroll the current content to the left. If the motion information detected from the second signal indicates that the mobile terminal 100 has been rapidly tilted to the right, the controller 180 may display the contents respectively corresponding to the subsequent icons or items in the list displayed in operation S10 to the icon or item corresponding to the current content in a slideshow mode at a high speed. In short, the speed at which the controller 180 performs an operation in response to the second signal may be determined by the motion information detected from the second signal.

If a menu for choosing and executing one of a number of applications corresponding to the current content is set to be displayed in response to the second signal, the controller 180 may display the menu in the display region (S80). Thereafter, if a command to select one of a plurality of menu items included in the menu displayed in operation S80 is received, the controller 180 may execute an application corresponding to the selected menu item (S90).

The type of menu that can be displayed in operation S80 or the manner in which the menu can be displayed may vary according to the motion information detected from the second signal. If one of the applications corresponding to the current content is set to be executed in response to the second signal (S95), the controller 180 may execute the corresponding application (S90). If it is determined that a preset amount of time has already passed since the first signal was detected for the first time or if no operation is set to be performed in response to the second signal, the controller 180 may maintain the display of the current content (S100) until an additional interrupt command is received.

Figure 6:
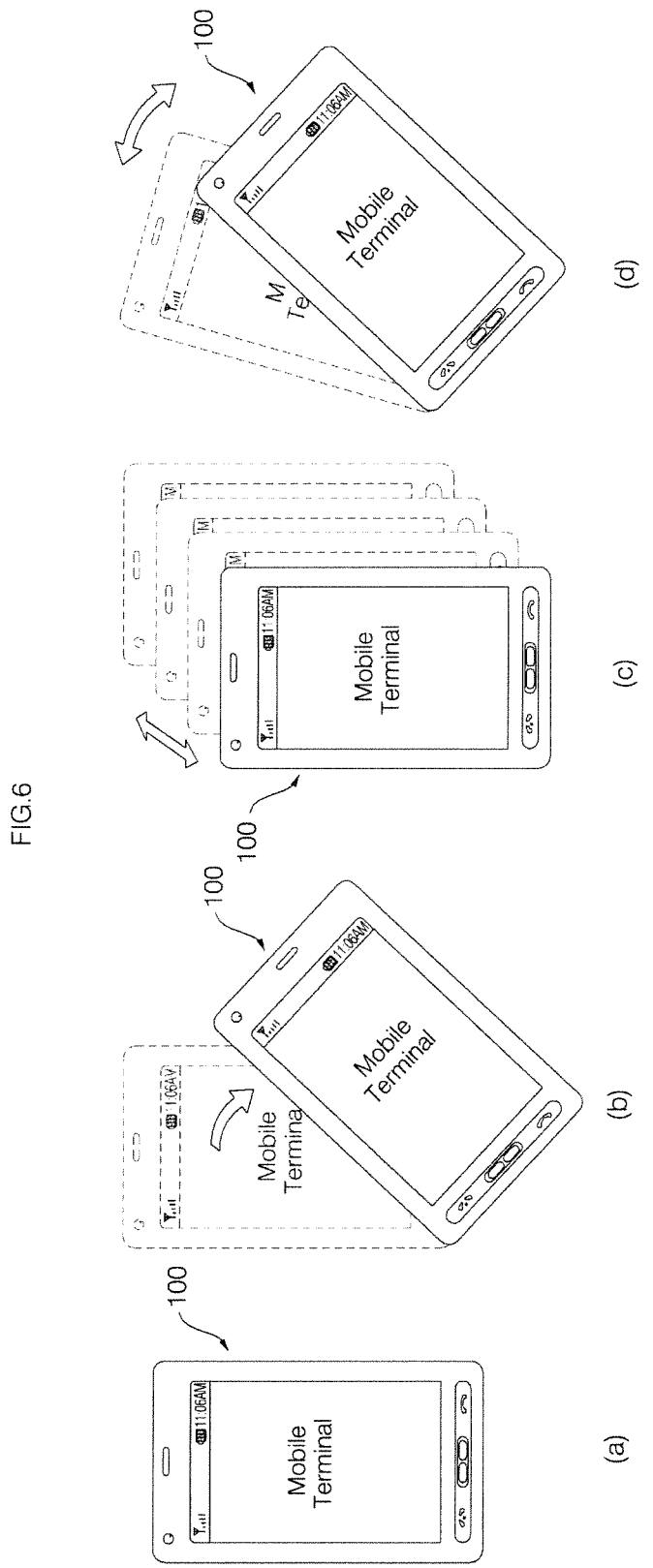
FIGS. 6(*a*) through 17 illustrate diagrams for further describing the methods illustrated in FIGS. 4 and 5.

FIGS. 6(a) through 6(d) illustrate diagrams showing examples of the motion of the mobile terminal 100 that can be detected by the gyro-sensor 142. If the user tilts the mobile terminal 100 to the left or to the right, as shown in FIG. 6(b), moves the mobile terminal 100 back and forth, as shown in FIG. 6(c), or shakes the mobile terminal 100 laterally, as shown in FIG. 6(d), when the mobile terminal 100 stands upright, as shown in FIG. 6(a), the gyro-sensor 142 may detect the motion of the mobile terminal 100, generate a signal corresponding to the detected motion, and output the generated signal to the controller 180.

Then, the controller 180 may detect motion information of the mobile terminal 100 from the signal generated by the gyro-sensor 142. The motion information detected by the controller 180 may include a tilted angle, a moving direction, and a moving speed of the mobile terminal 100, the number of times the mobile terminal 100 has been moved, the pattern of the movement of the mobile terminal 100, and the location of the mobile terminal 100. The controller 180 may detect motion information corresponding to a desired operation from the signal generated by the gyro-sensor 142.

Various operations that can be performed by the controller 180 in response to a signal generated by the gyro-sensor 142 when the mobile terminal 100 is tilted at a preset angle will hereinafter be described in detail. Also, the specific operations being performed in response to a type of motion information may vary according to the setting of the mobile terminal 100.

Figure 7:
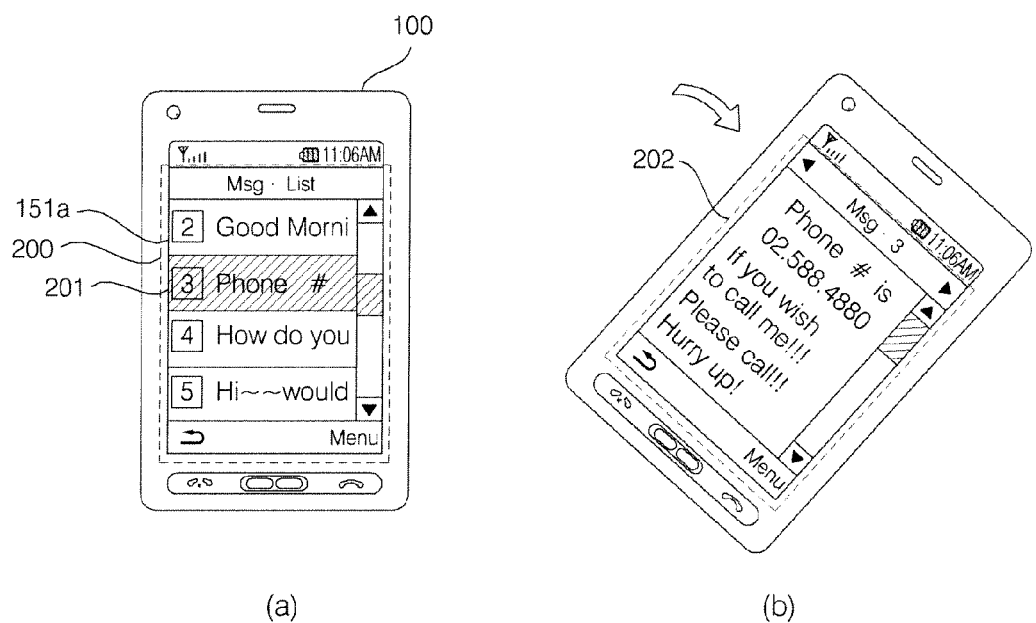

Referring to FIG. 7(a), a screen image 200 including a list of a plurality of items respectively corresponding to a plurality of incoming messages received by the mobile terminal 100 may be displayed in a display region 151a. If the display module 151 of the mobile terminal 100 is a touch screen, the user may touch to select one of the items included in the list. Then, the controller 180 may display a screen image 202 including an incoming message corresponding to the selected item in the display region 151a.

In the embodiment exemplified in FIGS. 4 and 5, the controller 180 may determine whether a first signal corresponding to the motion of the mobile terminal 100 has been generated by the gyro-sensor 142. If the mobile terminal 100 is tilted, as shown in FIG. 7(b), the gyro-sensor 142 may detect the motion of the mobile terminal 100 and generate a first signal corresponding to the detected motion. An example of this includes detecting a first rotation of the mobile terminal about a first axis of rotation which exceeds a first threshold (e.g., 5-185 degrees).

The controller 180 may detect motion information of the mobile terminal 100 from the first signal generated by the gyro-sensor 142. The controller 180 may determine that the mobile terminal 100 is tilted to the right, for example, by about 30-60 degrees, based on the detected motion information.

Therefore, the controller 180 may display an incoming text message in the display region 151a in response to the first signal as shown in FIG. 7(b). This is a specific example of performing a first function responsive to the tilting or motion of the mobile terminal. Specifically, the controller 180 may display an incoming message corresponding to a highlighted item 201 in the display region 151a shown in FIG. 7(a). In this manner, the user may identify an incoming message corresponding to the highlighted item 201 without the need to touch the highlighted item 201 or manipulate any hard or soft key.

Figure 8:
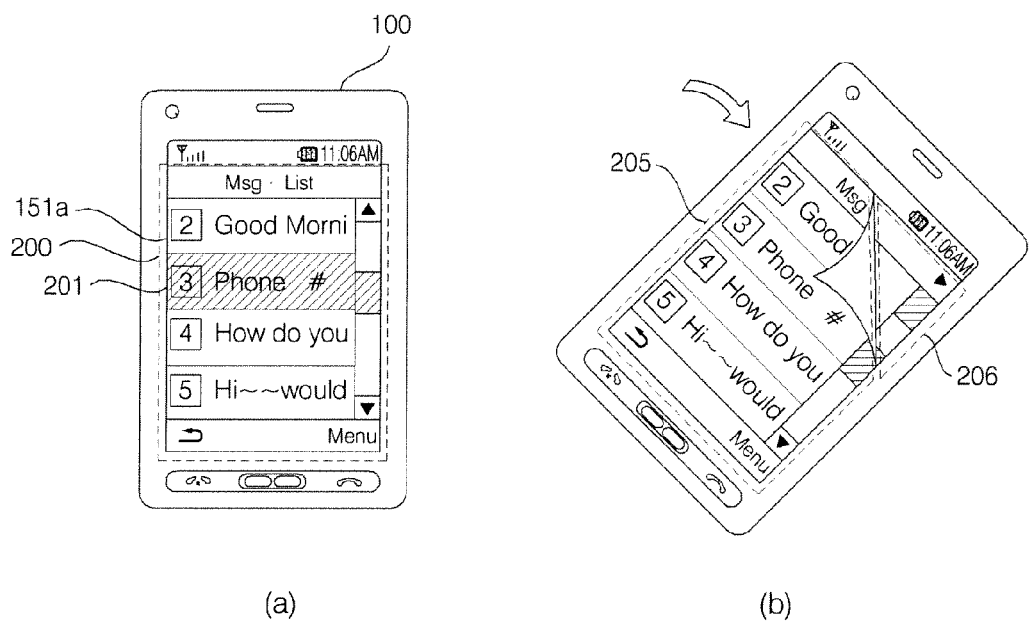

Referring to FIGS. 8(a) and 8(b), if the user tilts the mobile terminal 100 when the mobile terminal 100 is in an upright position, the gyro-sensor 142 detects the motion of the mobile terminal 100 and generates a first signal. The controller 180 may detect the tilted angle of the mobile terminal 100 from the first signal generated by the gyro-sensor 142. Thereafter, the controller 180 may display a text message corresponding to a highlighted item 201 in the display region 151a by applying a page-turn effect to the display region 151a so as to render a screen image 205 including a list of incoming text messages as being turned over.

The page-turn effect may be applied to the display region 151a in response to the first signal. Therefore, the controller 180 may vary the speed of turning over the screen image 205 according to the tilted angle and a speed at which the mobile terminal 100 is tilted. In addition, the controller 180 may increase the angle at which and the degree to which the screen image 205 is folded while being turned over according to the motion information of the mobile terminal 100.

Figure 9:
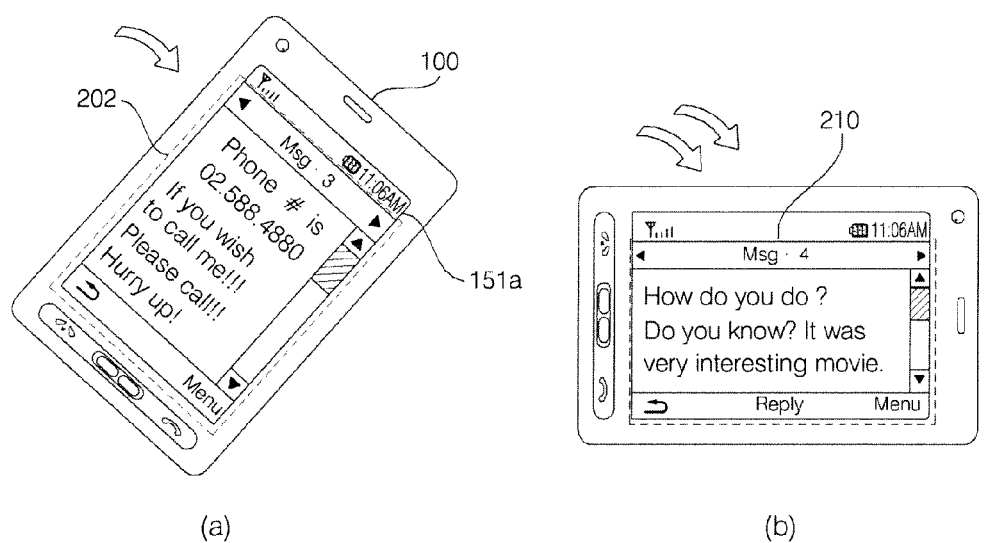

Referring to FIG. 9(a), the gyro-sensor 142 generates a first signal when the mobile terminal 100 is tilted. Then, the controller 180 determines whether a preset amount of time has passed since the generation of the first signal or whether the gyro-sensor 142 has also generated a second signal.

Referring to FIG. 9(a), if the mobile terminal 100 is tilted further to the right so as to have the tilted angle of about 90 degrees in reference to a vertical direction when a screen image 202 including a text message "Msg. 3" is displayed, the gyro-sensor 142 may generate a second signal. The term "text message" is also referred to herein more generically as "content," and thus, this term refers to items other than text messages. However, the tilted angle of the mobile terminal 100 for generating the second signal is not restricted to that set forth herein. When the gyro-sensor 142 generates the second signal, the controller 180 may perform a predetermined operation in response to the second signal. This is one example of identifying a condition if a second rotation of the mobile terminal about a second axis (which may be the same or different than the first axis) exceeds a second threshold. For example, the controller 180 may display a screen image 210 including a text message "Msg. 4" subsequent to the text message "Msg. 3" in the display region 151a.

As described above, the controller 180 may sequentially display a number of text messages included in a list in a slideshow mode. The speed at which the text messages are displayed in the slideshow mode may correspond to motion information detected from the second signal generated by the gyro-sensor 142, and particularly, the tilted angle of the mobile terminal 100 and the speed at which the mobile terminal 100 is tilted. If the mobile terminal 100 is tilted to the left by about 90 degrees when the text message "Msg. 3" is displayed in the display region 151a, as shown in FIG. 9(a), the controller 180 may display a text message "Msg. 2", instead of the text message "Msg. 4", in the display region 151a.

Figure 10:
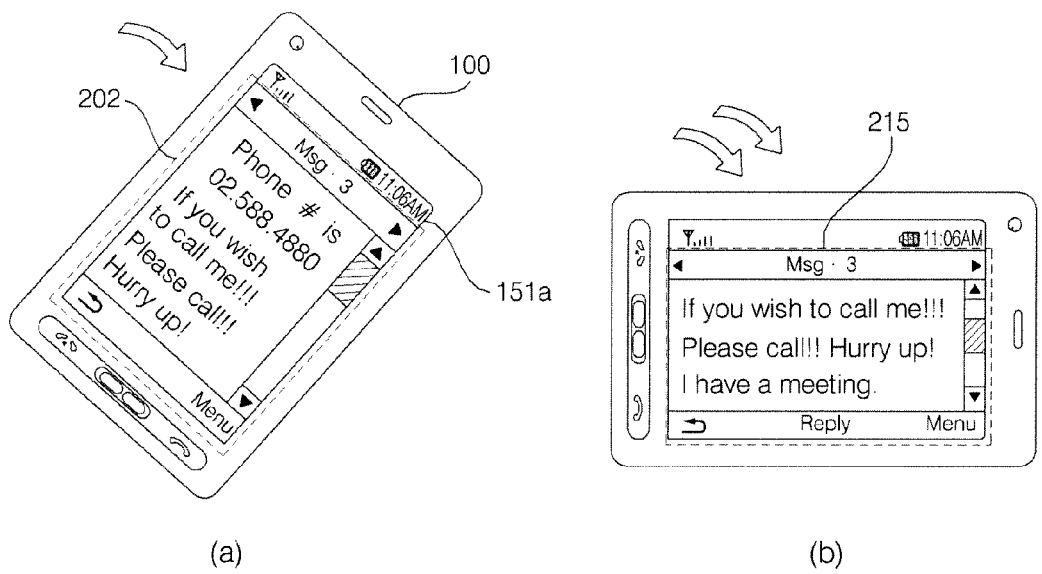

FIGS. 10(a) and (b) illustrate how to perform a content-scroll operation in response to a second signal. If the mobile terminal 100 is tilted further to the right, as shown in FIG. 10(b), when already tilted to the right, as shown in FIG. 10(a), the gyro-sensor 142 may generate a second signal corresponding to the motion of the mobile terminal 100. Then, the controller 180 may allow the content currently being displayed in the display region 151a, or a text message "Msg. 3", to be scrolled, as shown in FIG. 10(b).

The speed at which and the direction in which the text message "Msg. 3" is scrolled may be determined by motion information detected from the second signal. For example, if the motion information detected from the second signal indicates that the mobile terminal 100 has been moved at a high speed, the controller 180 may increase the speed of scrolling.

Figure 11:
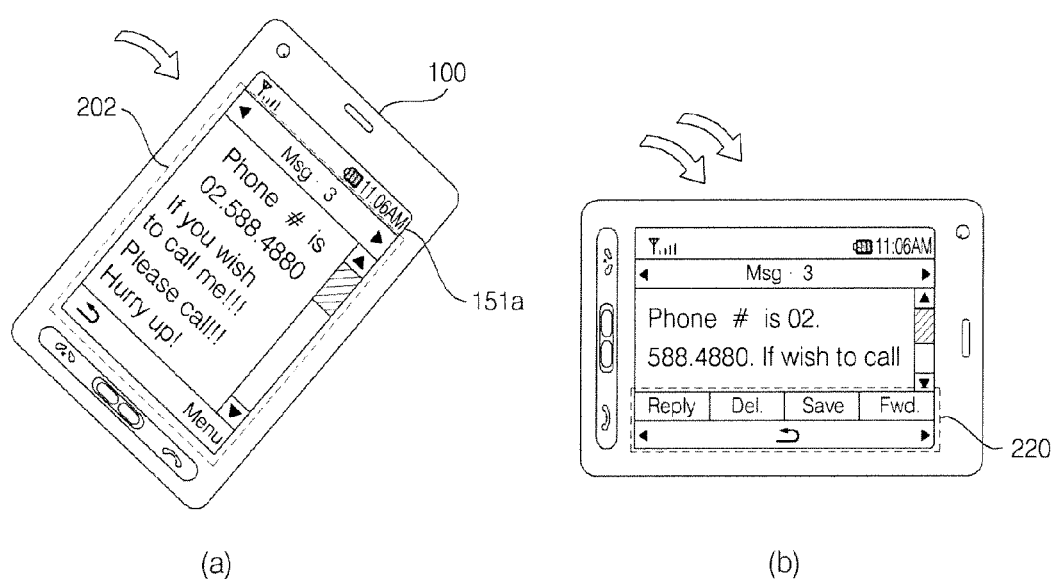

FIGS. 11(a) and 11(b) illustrate how to display a menu for selecting and executing a number of applications corresponding to the content currently being displayed in response to a second signal. If the mobile terminal 100 is tilted further to the right, as shown in FIG. 11(b), when already tilted to the right, as shown in FIG. 11(a), the gyro-sensor 142 may generate a second signal corresponding to the motion of the mobile terminal 100. Then, the controller 180 may display a menu screen 220 for selecting and executing one of a plurality of applications corresponding to the text message "Msg. 3" currently being displayed in the display region 151a. The user may select one of the applications corresponding to the text message "Msg. 3" from the menu screen 220 and execute the selected application.

Figure 12:
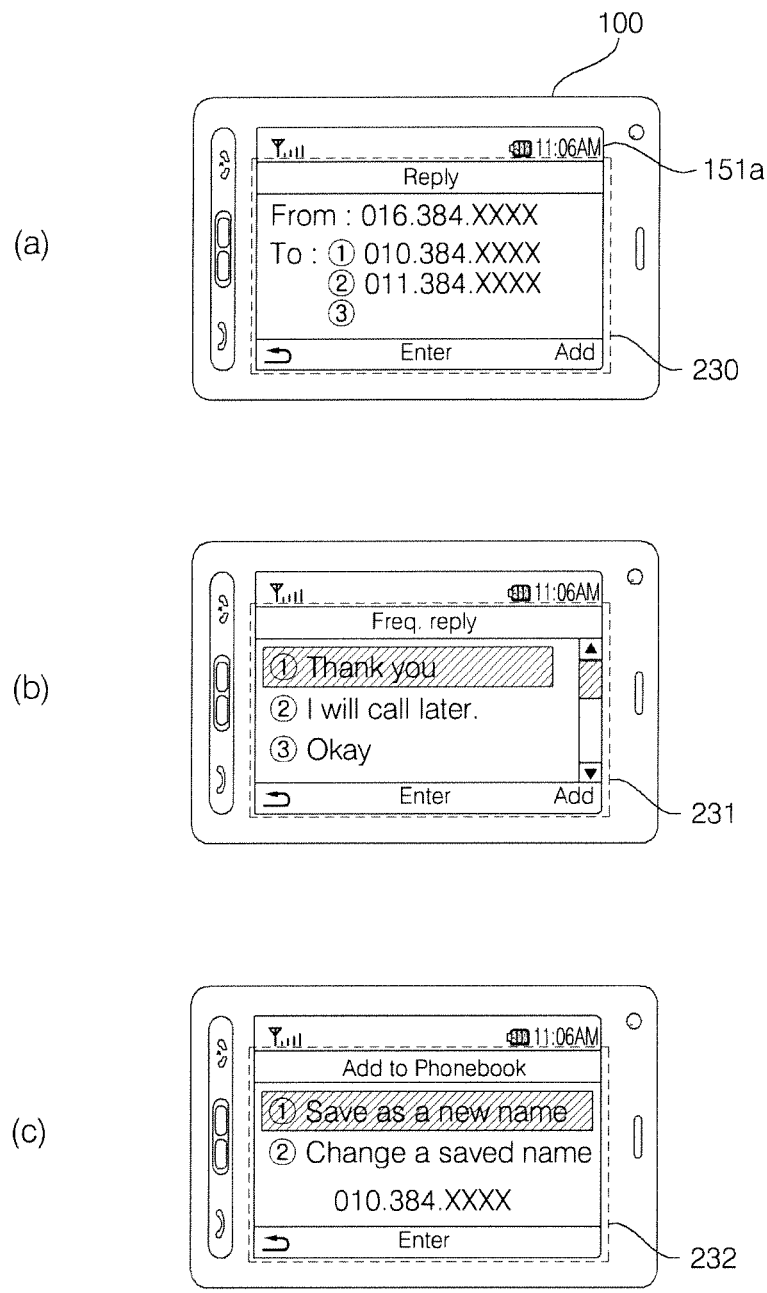

FIGS. 12(a)-(c) illustrate how to execute an application corresponding to the content currently being displayed in response to a second signal. Referring to FIGS. 12(a)-(c), if the controller 180 detects that the gyro-sensor 142 has generated the second signal while displaying a text message in the display region 151a, the controller 180 may execute a predetermined application corresponding to the content in response to the second signal. Specifically, referring to FIG. 12(a), the controller 180 may execute an application for sending a reply text message in response to the second signal, thus displaying an appropriate screen image 230.

Alternatively, referring to FIG. 12(b), the controller 180 may execute an application for allowing the user to select one of a plurality of frequently-used phrases and to send a reply text message using the selected one of the plurality of frequently-used phrases in response to the second signal, displaying the screen image 231. Still alternatively, referring to FIG. 12(c), the controller 180 may execute an application for storing a phone number in response to the second signal, displaying a screen image.

The type of application that can be performed in response to the second signal is not restricted to those set forth herein. Further, the type of application that can be performed in response to the second signal may vary according to motion information obtained from the second signal. For example, if the motion information detected from the second signal indicates that the mobile terminal 100 has been slowly tilted to the right, the controller 180 may execute an application for sending a reply text message. On the other hand, if the motion information detected from the second signal indicates that the mobile terminal 100 has been quickly tilted to the right, the controller 180 may execute an application for making a call to a phone number corresponding to the text message currently being displayed.

Moreover, the type of application that can be performed in response to the second signal may vary according to whether a soft key or a hard key of the mobile terminal 100 has been additionally manipulated. For example, if the user tilts the mobile terminal 100 to the right while manipulating a side key of the mobile terminal 100 for increasing sound volume, the controller 180 may execute an application for sending a reply text message. On the other hand, if the user tilts the mobile terminal 100 to the right while manipulating a side key of the mobile terminal 100 for reducing sound volume, the controller 180 may perform a slideshow mode.

The type of operation that can be performed in response to the second signal is not restricted to those set forth herein. That is, the controller 180 may perform various operations, other than those set forth herein, upon generation of the second signal.

Figure 13:
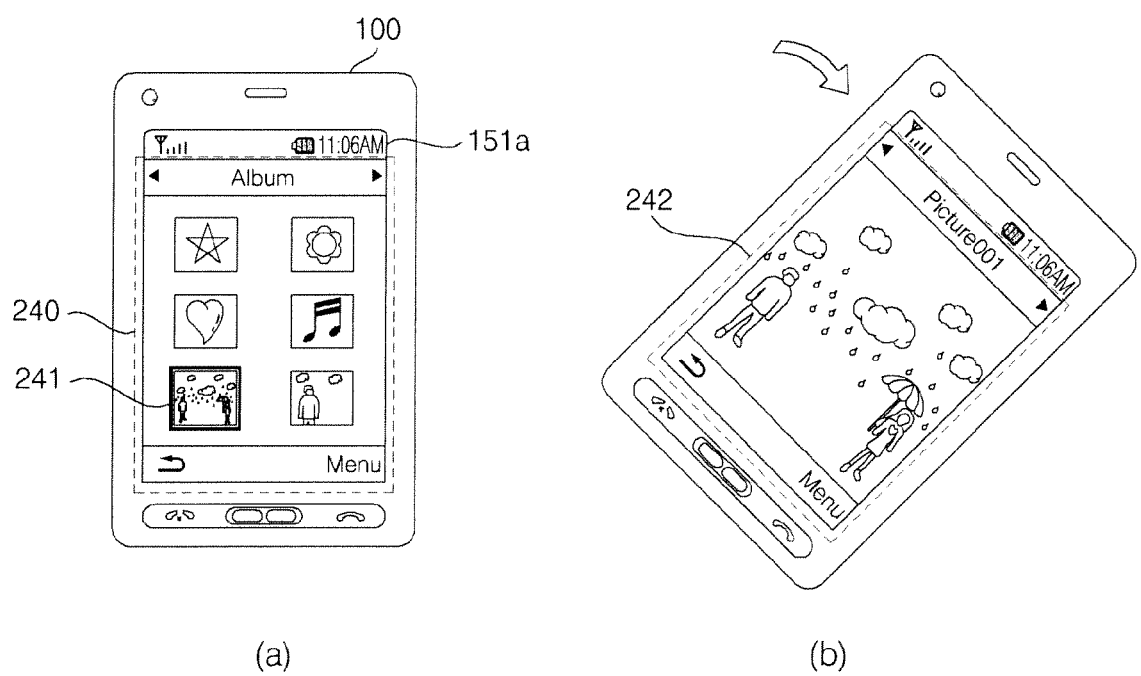
Figure 14:
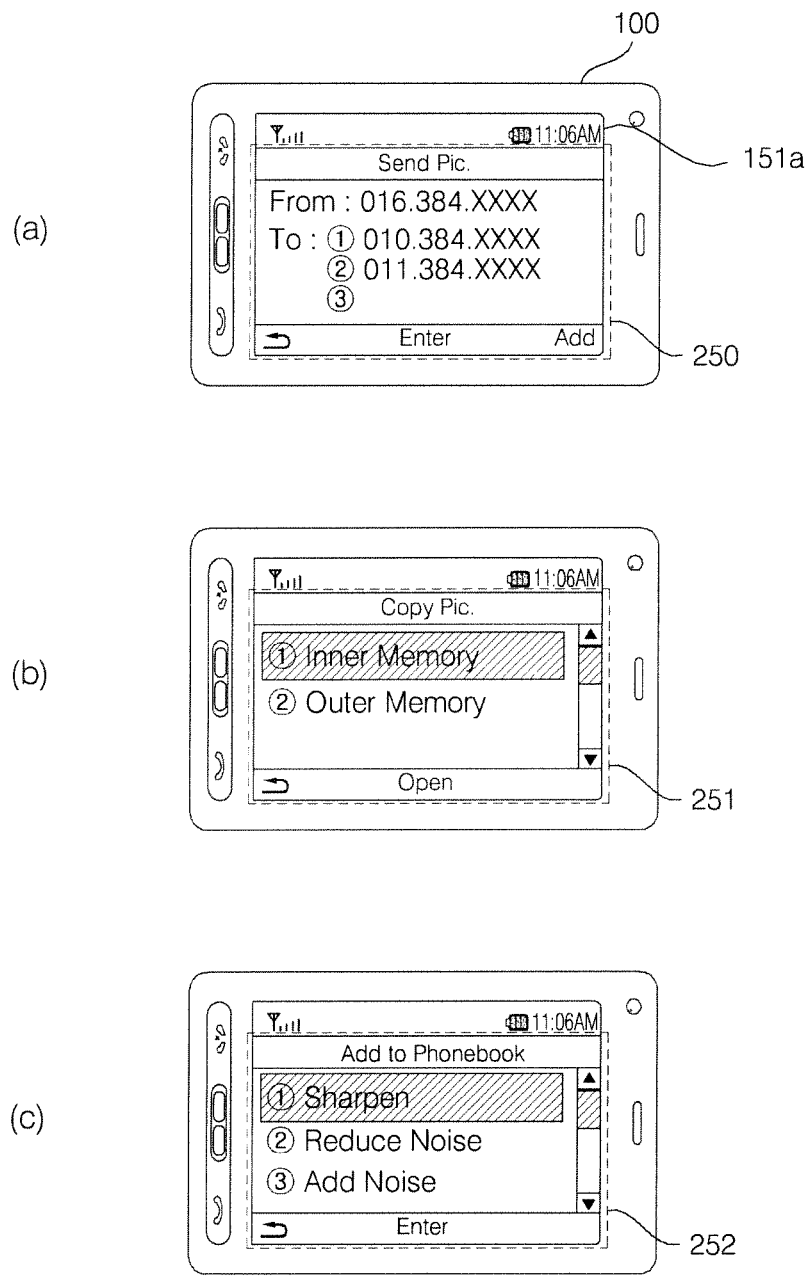
Figure 15:
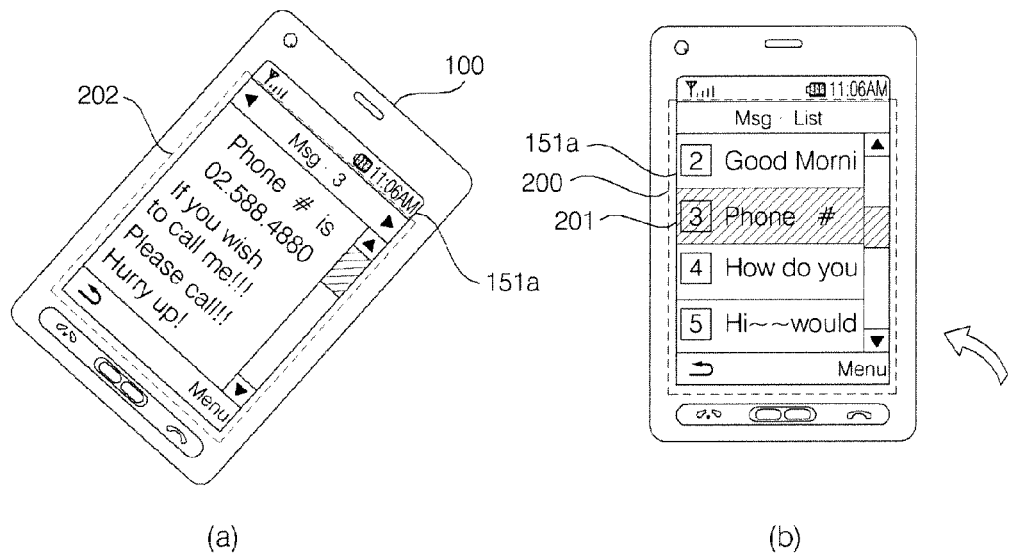
Figure 16:
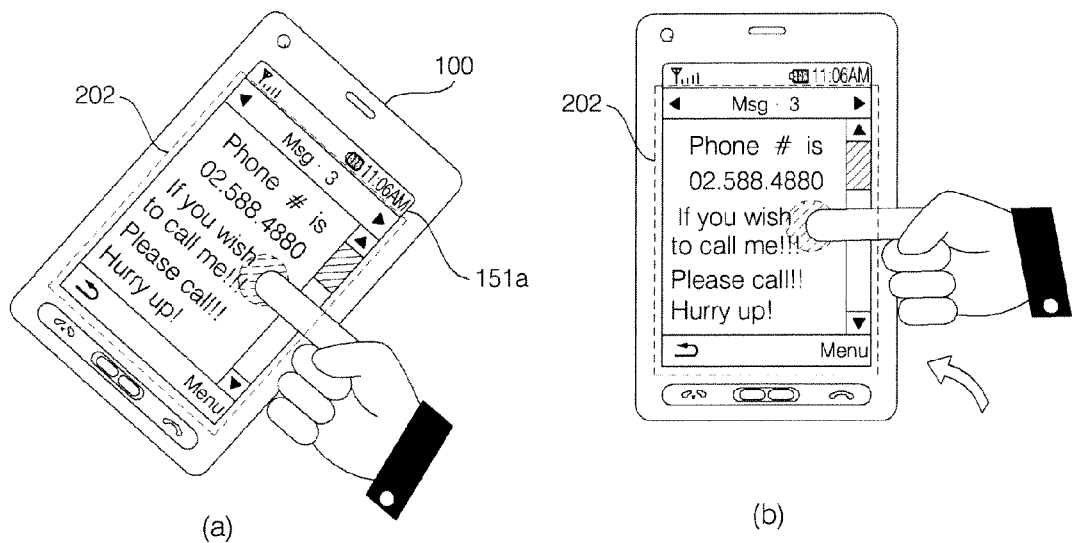

FIGS. 13(a)-14(c) illustrate how to display multimedia content such as a photo in response to a first signal and how to perform a predetermined operation corresponding to the multimedia content in response to a second signal. Referring to FIG. 13(a), the controller 180 displays a list of a plurality of icons respectively corresponding to a plurality of photos in the display region 151a. Thereafter, if the mobile terminal 100 is tilted to the right when one of the plurality of icons, for example, icon 241, is highlighted, the gyro-sensor 142 generates a first signal. Then, the controller 180 displays a photo 242 corresponding to the icon 241 in the display region 151a, as shown in FIG. 13(b).

When the photo 242 is displayed in the display region 151a, as shown in FIG. 13(b), if the mobile terminal 100 is tilted further to the right, as shown in FIGS. 14(a)-(c), the gyro-sensor 142 may generate a second signal. Then, the controller 180 may perform a predetermined operation in response to the second signal. Examples of the predetermined operation include performing a content-slideshow operation, performing a content-scroll operation, executing one of a number of applications corresponding to the photo 242, and displaying a menu for selecting and executing one of the applications corresponding to the photo 242.

Specifically, referring to FIG. 14(a), the controller 180 may execute an application for sending the photo 242 in response to the second signal, displaying the screen image 250. Alternatively, referring to FIG. 14(b), the controller 180 may execute an application for copying the photo 242 in response to the second signal, displaying the screen image 251. Still alternatively, referring to FIG. 14(c), the controller 180 may execute an application for editing the photo 242 in response to the second signal, displaying the screen image 252.

FIGS. 15(a)-16(b) illustrate the case where a first signal is generated when the mobile terminal 100 is moved and a second signal is generated when the mobile terminal 100 returns to its original position. The controller 180 may determine whether the mobile terminal 100 has returned to its original position based on motion information detected from the second signal generated by the gyro-sensor 142.

Specifically, referring to FIGS. 15(a) and 15(b), if the mobile terminal 100 is tilted to the right by about 30-60 degrees, as shown in FIG. 15(a), and then tilted back to its original position, as shown in FIG. 15(b), the controller 180 may display the screen image 200 including, for example, a list of incoming text messages, in the display region 151a. In FIGS. 15(a) and 15(b), the controller 180 displays the screen image 200 which was displayed before the mobile terminal 100 was tilted to the right by about 30-60 degrees after the mobile terminal 100 is tilted back to its original position.

Alternatively, referring to FIGS. 16(a) and 16(b), even if the mobile terminal 100 is tilted back to its original position, as shown in FIG. 16(b), after being tilted to the right by about 30-60 degrees, as shown in FIG. 16(a), the controller 180 may continue displaying the same content that was previously being displayed when the mobile terminal 100 was yet to return to its original position. Specifically, if it is determined that the mobile terminal 100 has returned to its original position, and that the screen of the mobile terminal 100 is being touched by the user, as shown in FIG. 16(a), the controller 180 may maintain the display of the same screen image 202, as shown in FIG. 16(b). As a result, the user may have a better look at the screen image 202.

If the proximity sensor 141 detects that the user's finger is nearby and approaching the touch screen, the controller 180 may vary the display of the content in the display region 151a. Thus, the user may easily determine whether the user's finger is detected by the mobile terminal 100 based on a variation in the display of the content in the display region 151a.

Figure 17:
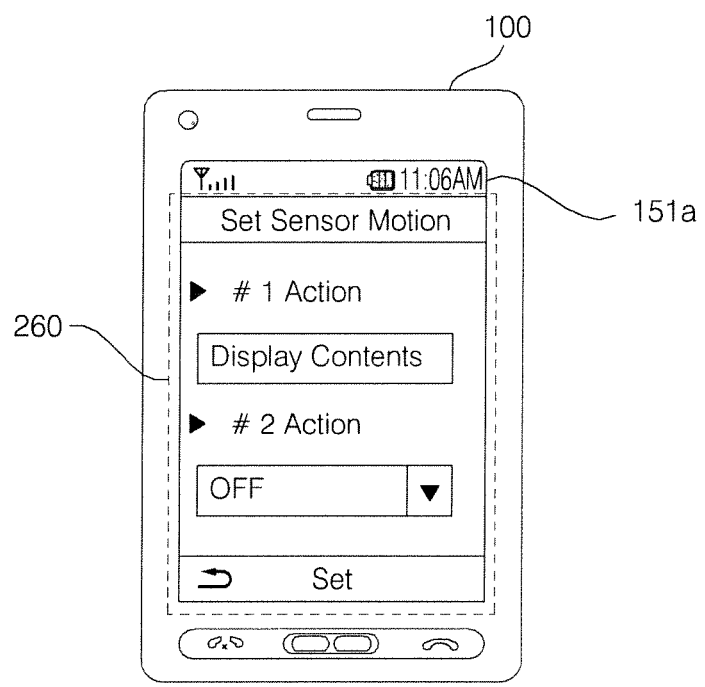

FIG. 17 illustrates an operation to be performed in response to each of first and second signals. Referring to FIG. 17, the controller 180 displays, in the display region 151a, the screen image 260 for setting an operation to be performed in response to a first signal and an operation to be performed in response to a second signal. Once the operations to be performed in response to the first and second signals are set, the controller 180 may perform the respective set operations upon generation of the first and second signals.

Figure 18:
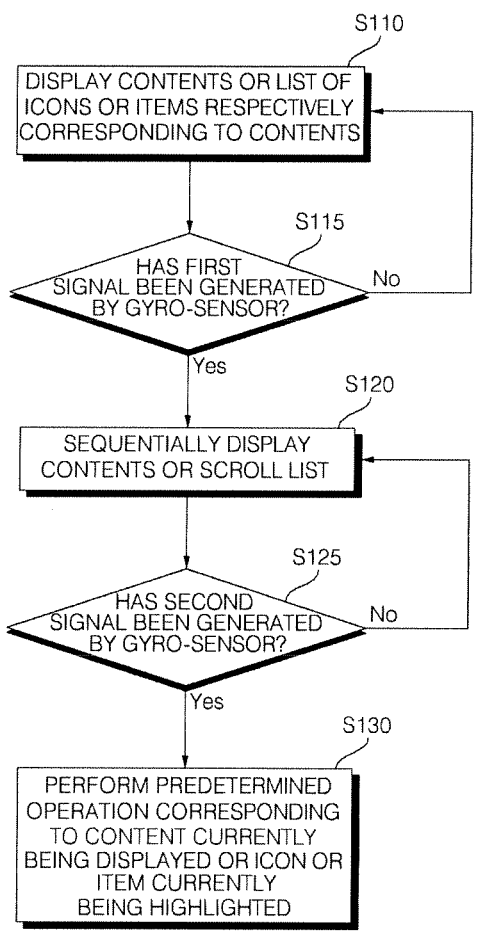
FIG. 18 is a flowchart illustrating operation of a mobile terminal according to a further embodiment of the present invention.

FIGS. 18 and 19(a)-(c) illustrate how to display a plurality of contents in a slideshow mode or scroll a list of icons or items in response to a first signal. Specifically, the flowchart in FIG. 18 illustrates a method of controlling a mobile terminal according to an embodiment of the present invention. Referring to FIG. 18, the controller 180 may display a plurality of contents or a list of a plurality of icons or items respectively corresponding to the contents in the display region 151a (S110). Thereafter, the controller 180 may determine whether a first signal corresponding to the motion of the mobile terminal 100 has been generated by the gyro-sensor 142 (S115).

If it is determined that the first signal has been generated by the gyro-sensor 142, the controller 180 may perform a content-slideshow operation such that the contents can be sequentially displayed (S120). The contents being displayed during the content-slideshow operation are contents corresponding to items or icons within one list. If a list includes 10 items and each item corresponds to one photo, the contents being displayed would be 10 photos respectively corresponding to each item of the list. Alternatively, the controller 180 may scroll the list while sequentially highlighting the icons or the items of the list.

Thereafter, the controller 180 may determine whether a second signal has been generated by the gyro-sensor 142 (S125). If it is determined that the second signal has been generated by the gyro-sensor 142, the controller 180 may perform a predetermined operation corresponding to one of the contents currently being displayed in the display region 151a or one of the icons or items currently being highlighted (S130).

Examples of the predetermined operation include displaying a menu for selecting and executing one of a number of applications corresponding to the content currently being displayed in the display region 151a and executing one of the applications corresponding to the content currently being displayed in the display region 151a. Therefore, it is possible for the user to execute an application corresponding to any arbitrary content, simply by moving the mobile terminal 100 twice.

FIGS. 19(a)-(c) illustrate the method described above referring to FIG. 18. Referring to FIG. 19(a), the controller 180 displays the screen image 300 including a text message "Msg. 1" in the display region 151a. Thereafter, referring to FIG. 19(b), if the mobile terminal 100 is tilted to the right, the gyro-sensor 142 may generate a first signal and perform a content-slideshow operation in response to the first signal such that the screen image 301 including a text message "Msg. 3" can be displayed in the display region 151a.

Thereafter, referring to FIG. 19(c), if the mobile terminal 100 is tilted further to the right, the gyro-sensor 142 may generate a second signal. Then, the controller 180 may execute an application corresponding to the text message "Msg. 3", for example, an application for sending a reply text message, displaying the screen image 302 for executing the application for sending the reply text message.

Figure 20:
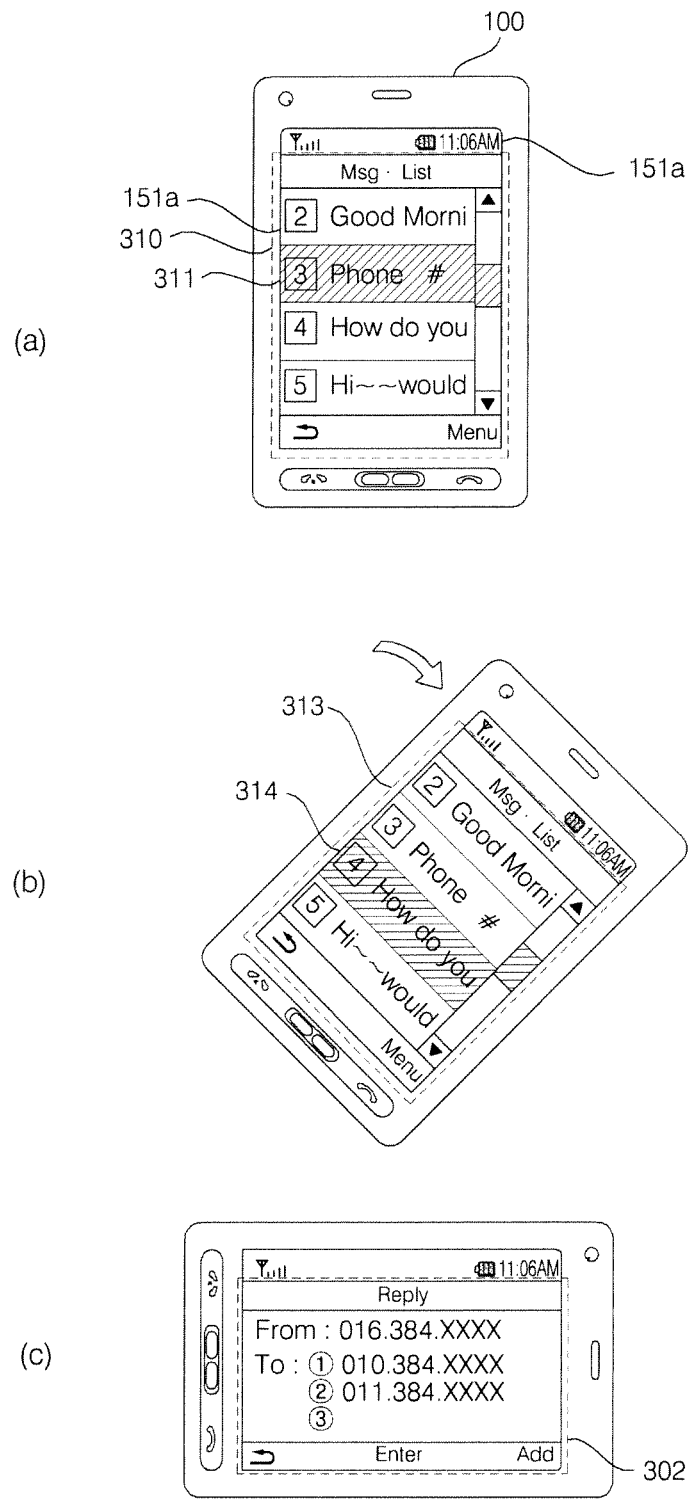

FIGS. 20(a)-(c) further illustrate the method described above referring to FIG. 18. Specifically, FIGS. 20(a)-(c) illustrate how the display of a list of a plurality of items respectively corresponding to a plurality of contents changes in response to first and second signals. Referring to FIG. 20(a), the controller 180 displays the screen image 310 including a list of a plurality of items 311 respectively corresponding to the plurality of contents in the display region 151a.

Thereafter, referring to FIG. 20(b), if the mobile terminal 100 is tilted to the right, the gyro-sensor 142 may generate a first signal, and the controller 180 may scroll the list in response to the first signal while sequentially highlighting the items 311 and 314. Thereafter, referring to FIG. 20(c), if the mobile terminal 100 is tilted further to the right, the gyro-sensor 142 may generate a second signal. Then, the controller 180 may execute an application corresponding to an item currently being highlighted, for example, the item 314. Subsequently, the controller 180 may execute an application for sending a reply text message, displaying the screen image 302 for executing the application for sending the reply text message, as shown in FIG. 20(c).

The mobile terminal and the method of controlling the operation of the mobile terminal according to the present invention are not restricted to the exemplary embodiments set forth herein. Therefore, variations and combinations of the exemplary embodiments set forth herein may fall within the scope of the present invention.

According to various embodiments of the present invention, motions of a mobile terminal are detected and various operations are performed according to the moving directions and/or moving speed of the mobile terminal, and/or the pattern and intensity of the movement of the mobile terminal. Therefore, it is possible for a user to quickly control the operation of the mobile terminal by using one of the user's hands in response to the motion of the mobile terminal.

Various features presented herein can be realized as code that can be read by a processor, such as a mobile station modem (MSM), included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave such as data transmission through the internet. The computer-readable recording medium can be distributed over a plurality of computer systems connected to a network such that computer-readable code is written thereto and executed therefrom in a decentralized manner. Functional programs, code, and code segments needed for realizing the present invention can be easily construed by one of ordinary skill in the art.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of controlling a mobile terminal, the method comprising:
    displaying a first screen on a display of the mobile terminal, wherein the first screen comprises a plurality of items that are individually user-selectable during the displaying of the first screen;
    selecting an item of the plurality of items in response to user input received at the mobile terminal;
    detecting a first rotation of the mobile terminal relative to an original position, the first rotation about a first axis of rotation which exceeds a first threshold amount of rotation, and wherein the selecting of the item occurs prior to the first rotation;
    performing a first function that is associated with the selected item responsive to the detecting of the first rotation exceeding the first threshold, wherein the performing the first function comprises displaying a second screen on the display, wherein the second screen comprises content corresponding to the selected item;
    terminating the displaying of the first screen in further response to the detecting of the first rotation exceeding the first threshold, wherein the displaying of the second screen occurs after the terminating of the displaying of the first screen;
    identifying a condition when a second rotation of the mobile terminal about a second axis of rotation exceeds a second threshold amount of rotation within a threshold time period after the detecting of the first rotation, wherein the second rotation occurs during the displaying of the second screen;

responsive to the identifying of the condition, performing a second function that is associated with the displayed content corresponding to the selected item;

redisplaying the first display screen comprising the plurality of items instead of performing the second function if the mobile terminal has returned to its original position due to the second rotation; and continuing to display the second screen comprising the content, instead of performing the second function, if the mobile terminal has returned to its original position due to the second rotation and a touch is received at the display during the second rotation or a touch is received at a side key of the mobile terminal during the second rotation.

2. The method according to claim 1,
wherein each of the plurality of items relate to a corresponding one of a plurality of messages,
wherein displaying the content corresponding to the selected item comprises:
displaying on the display a first portion of a message that corresponds to the selected item, and
wherein performing the second function comprises:
displaying on the display a second portion of the message that corresponds to the selected item.

3. The method according to claim 2, wherein the displaying of the second portion of the message defines a scrolling of the message that corresponds to the selected item, the method further comprising:
modifying direction of the scrolling of the message responsive to direction of the second rotation; and
modifying speed of the scrolling of the message responsive to speed of the second rotation.

4. The method according to claim 1,
wherein displaying the content corresponding to the selected item comprises:
displaying on the display only a first portion of the content corresponding to the selected item, and
wherein performing the second function comprises:
displaying on the display a second portion of the content corresponding to the selected item.

5. The method according to claim 1, wherein performing the second function comprises:
displaying on the display at least one user-selectable option relating to the selected item.

6. The method according to claim 5, wherein the at least one user-selectable option comprises at least an option to send a file associated with the content, an option to save a file associated with the content, or an option to delete a file associated with the content.

7. The method according to claim 5,
wherein the content comprises a message, and
wherein the at least one user-selectable option comprises at least an option to send the message, an option to save the message, or an option to delete the message.

8. The method according to claim 1, wherein the first axis of rotation and the second axis of rotation are substantially the same.

9. A mobile terminal comprising:
a display;
a sensor configured to detect a first rotation of the mobile terminal relative to an original position, the first rotation about a first axis of rotation which exceeds a first threshold amount of rotation, and detect a second rotation of the mobile terminal about a second axis of rotation; and
a controller configured to:
cause displaying a first screen on the display, wherein the first screen comprises a plurality of items that are individually user-selectable during the displaying of the first screen;
select an item of the plurality of items in response to user input received at the mobile terminal, wherein the selecting of the item occurs prior to the first rotation;
perform a first function that is associated with the selected item responsive to the detecting of the first rotation exceeding the first threshold, wherein the performing the first function comprises displaying a second screen on the display, wherein the second screen comprises content corresponding to the selected item;
terminate the displaying of the first screen in further response to the detecting of the first rotation exceeding the first threshold, wherein the displaying of the second screen occurs after the terminating of the displaying of the first screen;
identify a condition when a second rotation of the mobile terminal about a second axis of rotation exceeds a second threshold amount of rotation within a threshold time period after the detecting of the first rotation, wherein the second rotation occurs during the displaying of the second screen;
responsive to the identifying of the condition, perform a second function that is associated with the displayed content corresponding to the selected item;
cause redisplaying of the first display screen comprising the plurality of items instead of performing the second function if the mobile terminal has returned to its original position due to the second rotation; and
continue to display the second screen comprising the content, instead of performing the second function, if the mobile terminal has returned to its original position due to the second rotation and a touch is received at the display during the second rotation or a touch is received at a side key of the mobile terminal during the second rotation.

10. The mobile terminal according to claim 9,
wherein displaying the content corresponding to the selected item comprises:
displaying on the display only a first portion of content corresponding to the selected item, and
wherein the second function comprises:
displaying on the display a second portion of the content corresponding to the selected item.

11. The mobile terminal according to claim 9, wherein the second function comprises:
displaying on the display at least one user-selectable option relating to the selected item.

12. A method of controlling a mobile terminal, the method comprising:
displaying a first screen on a display of the mobile terminal a plurality of items, wherein each of the plurality of items relate to a corresponding one of a plurality of messages;
highlighting a selected item of the plurality of items in response to user input received at the mobile terminal;
detecting a first rotation of the mobile terminal about a first axis of rotation which exceeds a first threshold amount of rotation, wherein the highlighting of the selected item occurs prior to the first rotation;

performing a first function that is associated with the selected item responsive to the detecting of the first rotation exceeding the first threshold, wherein the first function comprises displaying on the display a first portion of a message that corresponds to the selected item;

identifying a condition when a second rotation of the mobile terminal about a second axis of rotation exceeds a second threshold amount of rotation within a threshold time period after the detecting of the first rotation;

responsive to the identifying of the condition, performing a second function that is associated with the selected item, wherein the second function comprises ceasing the performing of the first function that is associated with the selected item and displaying on the display a second portion of the message that corresponds to the selected item, wherein the displaying of the second portion of the message defines a scrolling of the message that corresponds to the selected item;

modifying direction of the scrolling of the message responsive to direction of the second rotation;

modifying speed of the scrolling of the message responsive to speed of the second rotation;

redisplaying the first screen comprising the plurality of items instead of performing the second function if the mobile terminal has returned to its original position due to the second rotation; and continuing to display the second screen comprising the content, instead of performing the second function, if the mobile terminal has returned to its original position due to the second rotation and a touch is received at the display during the second rotation or a touch is received at a side key of the mobile terminal during the second rotation.

13. The method according to claim 1, wherein the plurality of items comprise a sequential list of items, wherein the second function comprises:

displaying content corresponding to a subsequent item of the sequential list of items.

14. The method according to claim 1, wherein the second function comprises:

scrolling the content corresponding to selected item.

15. The method according to claim 1, further comprising:

identifying the condition when the threshold time period elapses after the detecting of the first rotation and no further rotation of the mobile terminal has been detected.

16. The mobile terminal according to claim 9, wherein the controller is further configured to identify the condition when the threshold time period elapses after the detecting of the first rotation and no further rotation of the mobile terminal has been detected.

17. The method according to claim 12, further comprising:

identifying the condition when the threshold time period elapses after the detecting of the first rotation and no further rotation of the mobile terminal has been detected.

\* \* \* \* \*